US012639044B2

(12) United States Patent
Jackson et al.

(10) Patent No.: US 12,639,044 B2
(45) Date of Patent: May 26, 2026

(54) API ABSTRACTION FOR GRAPHICAL DEVELOPMENT PLATFORMS

(71) Applicant: Insight Direct USA, Inc., Chandler, AZ (US)

(72) Inventors: Matt Jackson, Sudbury, MA (US); Mark Candelora, Watertown, MA (US)

(73) Assignee: Insight Direct USA, Inc., Chandler, AZ (US)

( * ) Notice: Subject to any disclaimer, the term of this patent is extended or adjusted under 35 U.S.C. 154(b) by 247 days.

(21) Appl. No.: 18/626,094

(22) Filed: Apr. 3, 2024

(65) Prior Publication Data
US 2024/0338181 A1    Oct. 10, 2024

Related U.S. Application Data

(60) Provisional application No. 63/457,886, filed on Apr. 7, 2023.

(51) Int. Cl.
G06F 8/20        (2018.01)
(52) U.S. Cl.
CPC ..................................... G06F 8/20 (2013.01)
(58) Field of Classification Search
None
See application file for complete search history.

(56) References Cited

U.S. PATENT DOCUMENTS

| | | | | | |
|---|---|---|---|---|---|
| 6,230,318 | B1 * | 5/2001 | Halstead | .................... | G06F 8/20 |
| | | | | | 717/109 |
| 11,531,763 | B1 * | 12/2022 | Gupta | .................... | G06F 21/577 |
| 12,481,482 | B1 * | 11/2025 | Thirunavukkarasu | .... | G06F 8/34 |
| 2004/0044985 | A1 * | 3/2004 | Kompalli | ................ | H04L 67/56 |
| | | | | | 719/310 |
| 2023/0087993 | A1 * | 3/2023 | Viswanathan | ............ | G06F 8/60 |
| | | | | | 717/105 |
| 2025/0190283 | A1 * | 6/2025 | Ligowski | .............. | G06F 9/3001 |

FOREIGN PATENT DOCUMENTS

WO        WO-2022194359 A1 *    9/2022    ............... G06F 8/36

OTHER PUBLICATIONS

Serna et al, A Visual Programming Framework for Wireless Sensor Networks in Smart Home Applications, CISTER Research Center. (Year: 2015).*
Alomairy et al, Abstraction Layer for Standardizing APIs of Task-Based Engines, IEEE, (Year: 2020).*

* cited by examiner

*Primary Examiner* — Wei Y Mui
(74) *Attorney, Agent, or Firm* — Kinney & Lange, P.A.

(57)        ABSTRACT

A method includes resolving a plurality of network addresses for a plurality of systems connected to a network, discovering a plurality of application programming interfaces operated by the plurality of systems, inspecting the plurality of application programming interfaces to determine a plurality of invokable elements of the plurality of application programming interfaces, and creating a plurality of connectors executable by a development platform to invoke the plurality of invokable elements. Each network address of the plurality of network addresses corresponds to a system of the plurality of systems, the development platform includes one or more graphically-represented programming functions, and the plurality of connectors is configured to allow the one or more graphically-represented programming functions of the development platform to invoke one or more of the plurality of invokable elements.

18 Claims, 3 Drawing Sheets

500

Resolve plurality of network addresses  502

Discover plurality of APIs  504

Inspect plurality APIs to determine plurality of invokable elements  506

508  Create plurality of connectors

Classify task performed by invokable element  514

Modify development platform  516

Create program using development platform  510

Invoke API using connectors of the plurality of connectors  512

700

702
Determine API Identity

704
Cross-reference API documentation database with API Identity

706
Determine invokable elements based on retrieved API documentation

708
Determine task(s) performed by invokable elements

API ABSTRACTION FOR GRAPHICAL DEVELOPMENT PLATFORMS

CROSS-REFERENCE TO RELATED APPLICATION

This application claims priority to U.S. Provisional Application No. 63/457,886, filed Apr. 7, 2023, and entitled "API ABSTRACTION FOR GRAPHICAL DEVELOPMENT PLATFORMS," the disclosure of which is hereby incorporated by reference in its entirety.

BACKGROUND

The present disclosure relates to application programming interfaces (APIs), and more specifically relates to systems and methods for allowing users lacking programming experience to use API functionality.

APIs are a software interfaces that facilitate access to features of systems, services, and applications. More specifically, APIs define communication standards that allow different software elements, such as services and applications, to interact. Users are able to write programs make requests to APIs in order to access systems, software, and applications. APIs can also be deployed in a network environment and users can write programs that request data and application services from a network-accessible API via a connection to the appropriate network.

Often, network systems that expose APIs also maintain graphical interfaces that allow access to services and applications through network browsers and other, similar applications. Typically, API functionality is unavailable to users lacking sufficient programming expertise to write programs that make API requests. Conversely, the graphical interfaces maintained by network systems do not require programming expertise to use, but can be time-consuming and cumbersome to operate. Accordingly, users lacking programming experience often access network system services and applications through graphical interfaces rather than by invoking API functionality.

SUMMARY

An example of a method includes resolving a plurality of network addresses for a plurality of systems connected to a network, discovering a plurality of application programming interfaces operated by the plurality of systems, inspecting the plurality of application programming interfaces to determine a plurality of invokable elements of the plurality of application programming interfaces, and creating a plurality of connectors executable by a development platform to invoke the plurality of invokable elements. Each network address of the plurality of network addresses corresponds to a system of the plurality of systems, the development platform includes one or more graphically-represented programming functions, and the plurality of connectors is configured to allow the one or more graphically-represented programming functions of the development platform to invoke one or more of the plurality of invokable elements.

An example of a system includes a plurality of systems connected to a network, the plurality of systems configured to operate a plurality of application programing interfaces, and a user-accessible device connected to the network. The user-accessible device comprises a processor, a user interface, and a memory comprising a development platform, the development platform including one or more graphically-represented programming functions that can be graphically displayed using the user interface, and executable instructions. When executed, the instructions cause the processor to resolve a plurality of network addresses for the plurality of systems, discover the plurality of application programming interfaces operated by the plurality of systems, inspect the plurality of application programming interfaces to determine a plurality of invokable elements of the plurality of application programming interfaces, and create a plurality of connectors executable by the development platform to invoke the plurality of invokable elements. Each network address of the plurality of network addresses corresponding to a system of the plurality of systems and the plurality of connectors is configured to allow the one or more graphically-represented programming functions of the development platform to invoke one or more of the plurality of invokable elements.

The present summary is provided only by way of example, and not limitation. Other aspects of the present disclosure will be appreciated in view of the entirety of the present disclosure, including the entire text, claims, and accompanying figures.

Figure 1:
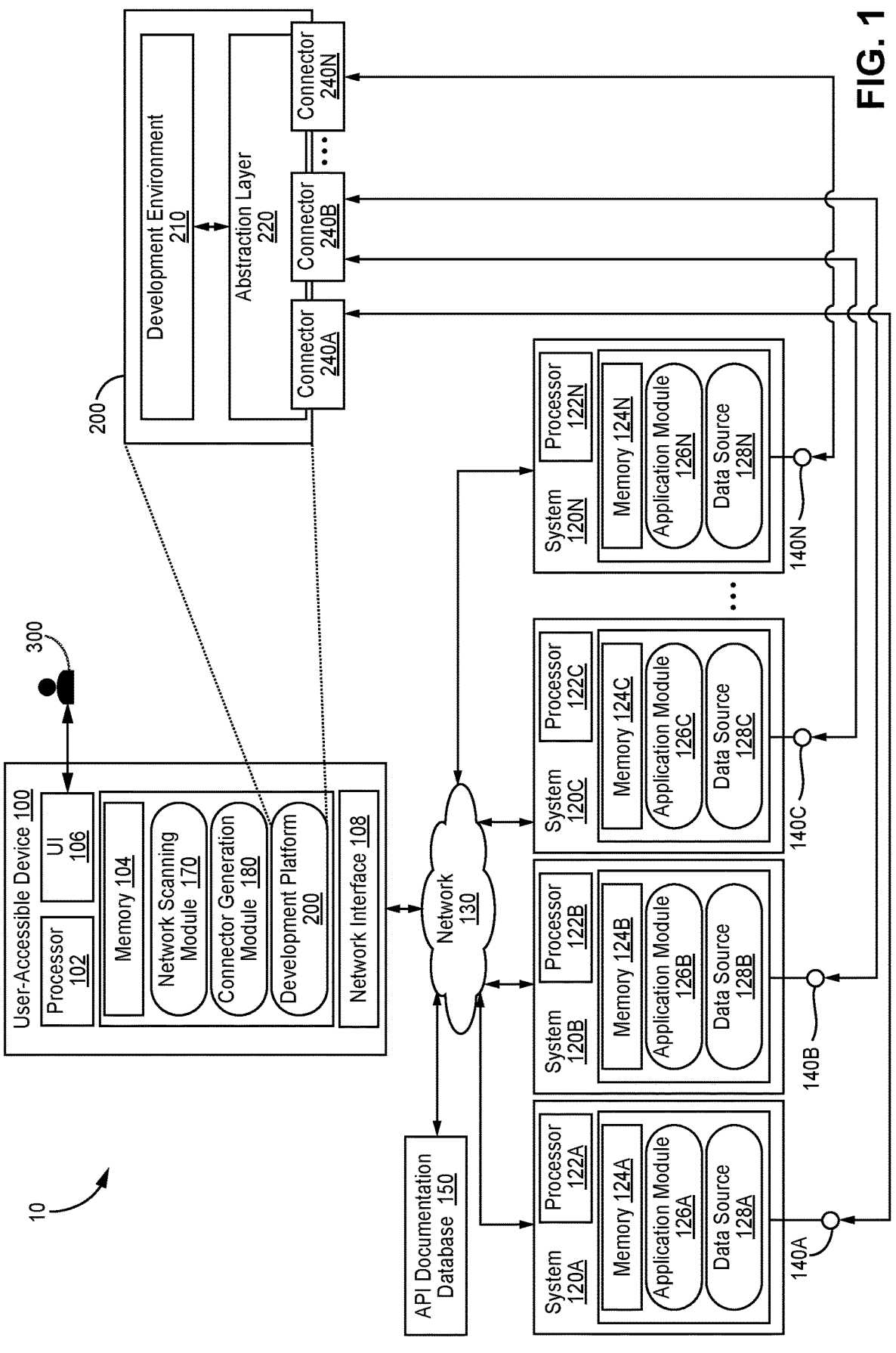
FIG. 1 is a schematic view of an example of a network system environment including a development platform.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present description relates to systems and methods that allow graphically-represented programming functions of a development platform to access and invoke API functionality. More specifically, the systems and methods of the present description can create software connectors as well as specific graphically-represented functions for invoking APIs accessible via a network. The graphically-represented functions of the development platforms described herein allow users lacking significant technical experience in programming tasks to develop and execute programs that invoke API functionality. As will be explained in more detail subsequently, users lacking significant programming expertise often use graphical interfaces maintained by network systems. These graphical tools are often cumbersome to use and, accordingly, can act as barriers to user productivity. In these examples, users can take advantage of API functionality to improve productivity.

Further, the systems and methods described herein enable the creation of software to interpret the graphically-represented functions of the development platform into commands recognizable by an API, functionally linking or connecting the graphical tools of the development platforms to network-accessible APIs. The software layer that links the graphical development platform to network-accessible APIs provides further advantages. Particularly, the using separate software elements to interpret commands from the development platform reduces labor required to adapt the development platform as API and/or system functionality changes and/or is updated, and further allows for any suitable development tool to be used to invoke API functionality. Moreover, the systems and methods described herein enable automated inspection of a network to discover network-accessible APIs as well as invokable elements (e.g., objects, methods, etc.) of those APIs. As will be explained in more detail subsequently, this advantageously reduces the labor required to implement the development platforms and software connectors described herein in network system environments.

FIG. 1 is a schematic diagram of network system environment 10, which is includes network-accessible systems as well as software configured to enable power users to create programs that can invoke APIs in order to retrieve and/or modify data maintained by those network-accessible systems. Network system environment 10 includes user-accessible device 100, systems 120A-120N, and network 130. User-accessible device 100 includes processor 102, memory 104, user interface 106, and network interface 108. Systems 120A-N include processors 122A-N, respectively, and memories 124A-N, respectively. Memories 124A-N store application modules 126A-N and data sources 128A-N. Network 130 connects systems 120A-N to user-accessible device 100 via hardware connections 132. Systems 120A-N expose APIs 140A-N, which enable devices connected to network 130 to access data and/or functions of systems 120A-N. API documentation database 150 is an optional component of network system environment 10 and, when included, is also connected to network 130, such that the devices connected to network 130 (e.g., user-accessible device 100 and/or systems 120A-N) can access API documentation database 150.

Memory 104 stores network scanning module 170, connector generation module 180, and development platform 200. Development platform 200 includes development environment 210 and abstraction layer 220. Abstraction layer 220 is able to electronically communicate with development environment 210 such that abstraction layer 220 can convert and relay requests from programs executed in development environment 210 to systems 120A-N as well as receive responses from systems 120A-N and return those responses to the programs executed in development environment 210. Abstraction layer 220 includes connectors 240A-N, which are software elements configured to allow abstraction layer 220 to communicate with APIs 140A-N of systems 120A-N. As will be explained in more detail subsequently, a user 300 can interact with user interface 106 to operate development environment 210 to create and execute programs. The programs created using development environment 210 can access functionality of the applications of application modules 126A-N and data of data sources 128A-N and via abstraction layer 220 and connectors 240A-N.

Advantageously, development environment 210 is configured to allow power users to create, modify, and execute programs. As referred to herein, a "power user" is an individual with an interest or need in using advanced or sophisticated functions of user-accessible device 100 and/or systems 210A-N, but who lacks extensive technical knowledge, training, and/or expertise. For example, a power user may have an interest in writing programs that automatically retrieve and/or modify data stored to data sources 128A-N, but may lack the technical knowledge to author a program using a conventional programming language. Development environment 210 includes one or more graphical elements that enable a power user to create, modify, and/or execute computer programs without requiring the power user to learn traditional programming skills and/or languages. In some examples, development environment 210 is a low-code or no-code environment that requires reduced, low, or minimal user experience to create programs.

Each of processors 102, 122A-N can execute software, applications, and/or programs stored on memories 104, 124A-N respectively. Examples of processors 102, 122A-N can include one or more of a processor, a microprocessor, a controller, a digital signal processor (DSP), an application specific integrated circuit (ASIC), a field-programmable gate array (FPGA), or other equivalent discrete or integrated logic circuitry. Each of processors 102, 122A-N can be entirely or partially mounted on one or more circuit boards.

Each of memories 104, 124A-N is configured to store information and, in some examples, can be described as a computer-readable storage medium. A memory 104, 124, in some examples, can be described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, one or more of memories 104, 124A-N is a temporary memory. As used herein, a temporary memory refers to a memory having a primary purpose that is not long-term storage. One or more of memories 104, 124A-N, in some examples, is described as volatile memory. As used herein, a volatile memory refers to a memory that that the memory does not maintain stored contents when power to the memory 104, 124A-N is turned off. Examples of volatile memories can include random access memories (RAM), dynamic random access memories (DRAM), static random access memories (SRAM), and other forms of volatile memories. In some examples, the memory is used to store program instructions for execution by the processor. The memory, in one example, is used by software or applications running on user-accessible device 100 and/or one or more of systems 120A-N to temporarily store information during program execution.

One or more of memories 104, 124A-N, in some examples, also includes one or more computer-readable storage media. Memories 104, 124A-N can be configured to store larger amounts of information than volatile memory. One or more of memories 104, 124A-N can further be configured for long-term storage of information. In some examples, one or more of memories 104,124 A-N includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

User interface 106 is an input and/or output device and enable an operator (e.g. user 300) to control operation of user-accessible device 100. User interface 106 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

Network interface 108 is a hardware component of user-accessible device 100 that enables user-accessible device 100 to access and transmit data over network 300. Network interface 108 can be a wired or wireless interface and can include one or more of a universal serial bus, an antenna, an ethernet connection, and/or a fiber optic connection, among other options.

User-accessible device 100 is a device accessible and usable by a user, such as user 300. In particular, user-accessible device 100 is configured to be used by individuals that are relatively inexperienced with and/or lack skill in performing programming tasks. User-accessible device 100 connects to network 300 vis network interface 108 and can to access systems 120A-N and/or API documentation database 150 via network 130. A user can operate user-accessible device 100 via user interface 106 to, for example, execute and/or create one or more programs of development platform 200. While user-accessible device 100 is shown as a single device in FIG. 1, in other examples user-accessible device 100 can be formed of multiple devices and/or the components of user-accessible device 100 can be distributed across multiple devices.

Each of systems 120A-N include one or more computer hardware elements, such as one or more servers, that are configured to perform one or more tasks in an enterprise organization or another suitable organization. Generally, each of systems 120A-N are configured to store and perform operations on data created and maintained by the organization. Systems 120A-N include processors 122A-N, respectively, and memories 124A-N, respectively. Processors 122A-N and memories 124A-N are substantially the same as processor 102 and memory 104, respectively, as discussed previously.

Each of application modules 126A-N include one or more programs that access and/or perform operations on data of data sources 128A-N. More specifically, for each system 120A-N, the applications of each respective application module 126A-N are configured to access and/or perform operations on the data of the respective data source 128A-N maintained by the system 120A-N. Data sources 128A-N maintain data used by systems 120A-N, respectively. Each data source 128A-N can store data in any suitable format and, in some examples, each data source 128A-N can store data in one or more databases.

Network 130 is network that connects user-accessible device 100 to systems 120A-N and to API documentation database 150. In some examples, network 130 can also connect systems 120A-N to API documentation database 150. Network 130 can be an enterprise network of any suitable size (e.g., a local area network, a wide area network, etc.). In other examples, network 130 can be any suitable network. In at least some examples, network 130 is the Internet.

API documentation database 150 is a database connected to network 130 and accessible to user-accessible device 100 via network 130. API documentation database 150 stores and organizes API documentation for various APIs. The API documentation stored by API documentation database 150 describes various invokable elements (e.g., methods, objects, etc.) of various APIs, including the function(s) performed by the invokable elements. API documentation database 150 can store API documentation for any combination of APIs, including APIs other than APIs 140-N. In at least some examples, API documentation database 150 includes API documentation for fewer than all of APIs

140A-N. API documentation database 150 is queryable by user-accessible device 100 and can store API documentation data in any suitable database structure.

Systems 120A-N expose and operate APIs 140A-N, which are software interfaces that allow other devices connected to network 130 to access the applications of application modules 126A-N, respectively, and/or the data of data sources 128A-N, respectively. APIs 140A-N can be stored by memories 124A-N, respectively. Each of APIs 140A-N can include one or more invokable elements that can be invoked by a device connected to network 130. The invokable elements of each of APIs 140A-N can be invoked to cause the respective system 120A-N to perform one or more computer operations, such as one or more operations on the data stored and maintained by data sources 128A-N. In some examples, invoking APIs can be referred to as "calling" the API and an invocation of one or more of the invokable elements of an API 140A-N can be referred to as a "call" and/or as a "request."

In some examples, each of APIs 140A-N can be substantially different from the others of APIs 140A-N, such that the invokable elements of each of APIs 140A-N are not shared or have limited overlap. Additionally and/or alternatively, two or more of APIs 140A-N can be substantially similar, such that the invokable elements of the two or more APIs 140A-N are the same, substantially the same, or have substantial overlap. As will be discussed in more detail subsequently, in the depicted non-limiting example, APIs 140B and 140C are substantially similar, API 140A is substantially different than APIs 140B-N, and API 140N is substantially different than APIs 140A-C.

APIs 140A-N can each be any suitable type of API. In at least some examples, one or more of APIs 140A-N can be a representational state transfer (REST) API. As used herein, "RESTful API" refers to a REST API or an API having characteristics of a REST API. In examples where an API 140A-N is a RESTful API, the invokable elements of the API 140A-N can be one or more objects or methods corresponding to methods or objects of the respective system 120A-N that operates the API 140A-N. Additionally and/or alternatively, one or more of APIs can be a web service.

Systems 120A-N can include graphical interfaces that allow users to use a web browser or another suitable application to access the functions and data of systems 120A-N. In these examples, the user can interact with the web browser or another suitable software application via user interface 106 to access applications of application modules 126A-N and/or data of data sources 128A-N. Graphical interface-mediated access of systems 120A-N can be cumbersome and time consuming. In examples where a user routinely accesses a particular data source or where different software applications are required to access different systems 120A-N and/or different elements of systems 120A-N, graphical interface-mediated access can cause substantial bottlenecks in user productivity.

User productivity can be significantly improved by use of APIs 140A-N rather than graphical interfaces of systems 120A-N to perform repeated or routine activities. However, existing techniques require users to create computer programs using programming languages to invoke the functionality of APIs 140A-N. Authoring programs using a programming language requires significant technical expertise and, accordingly, the functionality of APIs 140A-N is generally not accessible to users lacking technical expertise in writing computer programs.

Power users can often benefit from the functionality of APIs 140A-N but frequently lack the technical expertise required to write computer programs using a programming language. Development platform 200 is configured to allow power users to access the functionality of APIs 140A-N. Development platform 200 includes development environment 210, which is a graphical development environment that enables users to create programs using graphical tools that do not require significant programming skill. Development environment 210 includes graphically-represented functions that can be displayed by user interface 106 as well as additional graphical elements that enable users to create programs graphically by interacting with user interface 106. The graphical tools of development platform 200 are selected to be allow power users and other users lacking programming skill to create computer programs. A user can execute programs created in development environment 210 using development platform 200 or another program of memory 104. Development platform 200 also includes abstraction layer 220. Abstraction layer 220 includes connectors 240A-N and is configured to allow programs created using development environment to invoke the invokable elements of APIs 140A-N. The combination of development environment 210 and abstraction layer 220 allows development platform 200 to enable users lacking technical skill in programming to nonetheless create and use programs that access the functionality of APIs 140A-N.

In operation, users are able to create programs using development environment 210 and, in some examples, can execute those programs using development environment or another software element of development platform 200. User-accessible device 100 can display the graphically-represented functions of development environment to a user via user interface 106 and a user can interact with user interface 106 to create and execute programs using the graphical interface of development environment 210. Programs made using development environment 210 can be configured to request functionality of and/or send commands to abstraction layer 220. Abstraction layer 220 is configured to receive and those commands and/or requests and to invoke the appropriate functionality of the appropriate API 140A-N using the appropriate connector 240A-N. While abstraction layer 220 and development environment 210 are depicted in FIG. 1 and generally described herein as separate software elements, in some examples, abstraction layer 220 and development environment 210 can be integrated or substantially integrated to form a single software element capable of performing the functions of both abstraction layer 220 and development environment 210. While development platform 200 is shown as a stored to memory 104 of user-accessible device 100, in some examples, development platform can be stored to a network-connected device (e.g., a server connected to network 130) and accessed by user-accessible device 100 via a network connection.

Advantageously, development platform 200 improves user productivity by allowing users to automate repeated or routine tasks, and further by allowing users to create custom programs and applications to perform tasks that are complicated or time-consuming when performed using the graphical interfaces of systems 120A-N. Notably, the use of development environment 210 allows development platform 200 to facilitate improvements to user productivity without requiring users to undergo additional software-specific training, which can be expensive and can further require significant time to perform, potentially disrupting business operations typically performed by users while the training is performed.

Further, development platform 200 enables significantly more flexibility than existing methods of invoking API functionality. As systems 120A-N change due to, for example, changing operational requirements or business needs, the identity of APIs 140A-N can change, potentially requiring new commands or, in some examples, different programming languages to invoke APIs 140A-N. In existing systems (i.e., those not including development platform 200), these types of changes to APIs 140A-N can require reconfiguring of all programs that invoke APIs 140A-N and further can require re-training to learn commands and/or languages required to invoke the new API or APIs. Conversely, systems that include development platform 200 only require modification of abstraction layer 220 to allow the existing functions of development environment 210 to invoke the invokable elements of the new API or APIs. Advantageously, this can significantly reduce the time and cost required to update and/or substitute APIs 140A-N as compared to existing techniques.

Notably, the use of a separate abstraction layer 220 also allows any suitable development environment to function as development environment 210. That is, rather than reconfigure development environment 210, which may be may pose licensing (e.g., due to proprietary software elements, etc.) and/or development (e.g., due to challenges in reconfiguring compiled program code, etc.) challenges, abstraction layer 220 can instead be configured to accept and interpret commands from any suitable development environment 210. Abstraction layer 220 thereby advantageously confers implementational flexibility to development platform 200 in that the use of abstraction layer 220 allows any development environment 210 to benefit from the advantages described herein.

As described previously, connectors 240A-N enable abstraction layer 220 invoke functionality of APIs 140A-N. Connectors 240A-N are software elements and are selected based on the identity and functions of individual APIs of APIs 140A-N. As will be described in more detail subsequently, connectors 240A-N can be created using the programs of network scanning module 170 and connector generation module 180. Once created, connectors 240A-N can be stored to memory 104 and executed to allow programs made using development platform 200 to invoke the invokable elements of APIs 140A-N. Development platform 200, and more particularly abstraction layer 220, can execute connectors 240A-N to invoke functions of APIs 140A-N according to commands from programs created using development platform 200.

In some examples, one connector 240A-N allows programs made using development platform 200 to invoke a single API 140A-N. In yet further examples, more than one connector 240A-N can be used to invoke the functions of a single API 140A-N and/or a single connector 240A-N can be used to invoke more than one API 140A-N. In the example depicted in FIG. 1, a single API 240B can be used to invoke the functions of both API 140B and 140C due to the relative similarity of API 140B and API 140C. Also in the depicted example, separate connectors 140A and 140N are used to invoke the functions of API 140A and API 140N, respectively.

Network scanning module 170 includes one or more programs for discovering systems 120A-N. The program(s) of network scanning module 170 can APIs 140A-N, for example, analyzing network traffic received by network interface 108. More particularly, network scanning module 170 can cause network interface 108 to listen to communication transmitted via network 130. Network scanning module 170 can further be configured to resolve network addresses for systems 120A-N, such as internet protocol (IP) addresses, from data received using network interface 108.

Network scanning module 170 can further include one or more programs for identifying APIs 140A-N based on the received network traffic and/or the resolved network addresses. The received network communications can be analyzed to determine which of systems 120A-N expose APIs. Network scanning module 170 can further be configured to cause user-accessible device 100 to send API requests to systems 120A-N having resolved network addresses. Received responses from systems 120A-N can be used to determine which of systems 120A-N operate APIs and, in some examples, identity or other information that can be used to classify those APIs. For example, several requests can be sent iteratively from user-accessible device 100 and each iterative request can be configured to elicit a response from a particular type or class of API. Responses from systems 120A-N can be used accordingly to identify the type or class of API operated by each system 120A-N. API classification information can be associated with the network address or addresses for each system 120A-N and stored to memory 104.

Connector generation module 180 includes one or more programs for creating connectors 240A-N. Connector generation module 180 can be configured to inspect APIs 140A-N to identify the invokable elements of each of APIs 140A-N. Connector generation module 180 can then create software to allow the functions of programs created using development platform 200 to invoke those invokable elements and store that software to memory 104 as connectors 140A-N. Program(s) of connector generation module 180 can, for example, cross-reference the identities of each of APIs 140A-N determined using network scanning module 170 with API documentation database 150 to determine the functions and invokable elements of APIs 140A-N. Additionally and/or alternatively, program(s) of connector generation module 180 can perform test calls of one or more of APIs 140A-N to determine invokable elements of APIs 140A-N. The content of the responses to the test calls can be used to determine one or more invokable elements of the called API, such as one or more invokable methods or object, among other options. In some examples, connector generation module 180 can be configured to first cross-reference API documentation database 150 and subsequently to perform test calls to inspect APIs that do not have documentation in API documentation database 150.

In some examples, connector generation module 180 can be configured to flag APIs 140A-N and/or systems 120A-N for which invokable element information cannot be determined using the programs of connector generation module 180. Information describing those APIs 140A-N and/or systems 120 (e.g., IP address information) can be stored to memory 104 and, after the programs of connector generation module 140 have inspected or attempted to inspect all APIs 140A-N, user-accessible device 100 can create an output (e.g., a report) that can be communicated to a user (e.g., user 300) via user interface 106. The user can use the output to identify which of APIs 140A-N still require connectors and manually construct the connectors for those APIs.

Connector generation module 180 can further include programs that modify development platform 200 to use the generated connectors. Connector generation module 180 can, for example, create new functions or modify existing functions of development platform 200 to enable users to create programs to invoke the discovered invokable elements of APIs 140A-N. The text or graphical information that represents the function in development platform 200 can be selected based on, for example, a function performed by the corresponding invokable element of the relevant API. For example, where the invokable object is a method, the text or graphical information can be selected to describe or represent the what the method does and/or the object on which the method is performed. Connector generation module 180 can include a library of pre-determined text or graphics from which the text or graphical information for representing the invokable element can be selected. The text or graphics for representing the invokable element can be selected according to, for example, the function of the invokable element determined by the other program(s) of connector generation module 180.

Connector generation module 180 or another suitable module of memory 104 can also include one or more programs configured to modify development platform 200 to include the connectors created by connector generation module 180. More specifically, abstraction layer 220 of development platform 200 can be modified to include connectors 240A-N. In some examples, connectors 240A-N can be stored to another module or location of memory 104, and abstraction layer 220 can be configured to retrieve connectors 240A-N during execution programs of development environment 210 that include functions or commands for invoking one or more invokable elements of APIs 140A-N.

Network scanning module 170 and/or connector generation module 180 can be configured to perform the functions described herein automatically. For example, network scanning module 170 can be configured to automatically and, in some examples, periodically scan network 130 (e.g., by listening to network communications with network interface 108) to discover and identify APIs 140A-N. Connector generation module 180 can similarly be configured to automatically identify the invokable elements of APIs 140A-N, generate connectors 240A-N. for those invokable elements, and/or modify development platform 200 to use the generated connectors 240A-N.

Advantageously, network system environment 10 and, in particular, network scanning module 170 and connector generation module 180 allow for the construction of connectors 240A-N to link development platform 200 to APIs 140A-N based on information accessible via network 130. More specifically, network scanning module 170 and connector generation module 180 allow for APIs 140A-N to be discovered and inspected and further allow for the creation of connectors for each discovered API using network communication data received over network 130. Connector generation module 180 further allows for development platform 200 to be automatically modified to include functions that invoke the invokable elements of APIs 140A-N using the generated connectors. Accordingly, the combination of network scanning module 170 and connector generation module 180 allow the advantages of development platform 200 to be used in any suitable network system environment.

Existing methods of creating software to allow interoperability with one or more APIs require each software connector to be manually constructed, and as a result are time- and labor-intensive. The automated functions performed by the programs of network scanning module 170 and connector generation module 180 significantly reduce the time required for development platform 200 to be deployed in a new environment and/or for development platform 200 to be modified to access new functionality of modified, updated, or newly-added APIs as compared to existing methods. Further, the functions performed by network scanning module 170 and connector generation module 180 allow any suitable development environment to be used as development environment 210. Advantageously, reduces and/or eliminates labor required to create custom development environments that include connectors 240A-N to access and invoke API functionality.

Figure 2:
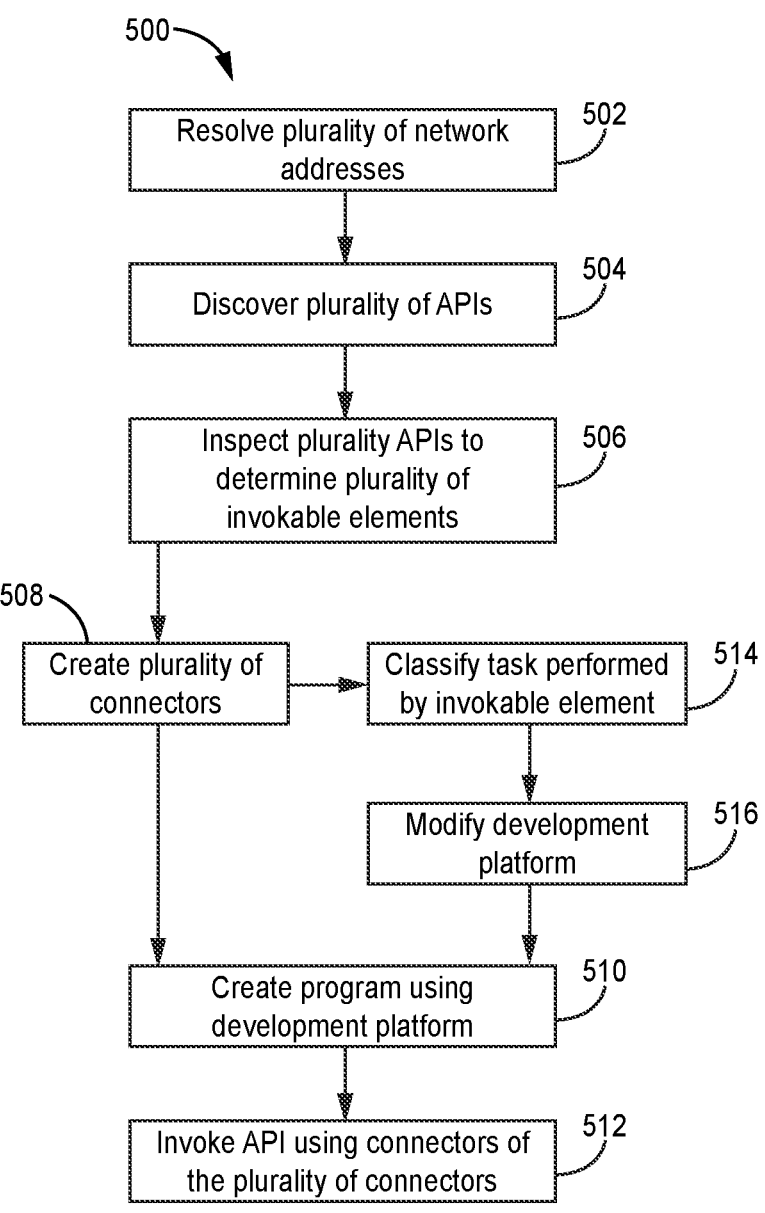
FIG. 2 is flow diagram of an example of a method of creating and using software connectors for the development platform of FIG. 1

FIG. 2 is a flow diagram of method 500, which is a method of creating and using software connectors for a development platform. Method 500 can be used to create connectors 240A-N for development platform 200. Method 500 includes steps 502-516 of resolving a plurality of network addresses (step 502), discovering a plurality of APIs (step 504), inspecting the plurality of APIs to determine a plurality of invokable elements (step 506), creating a plurality of connectors (step 508), classifying tasks performed by invokable elements (step 510), modifying the development platform (step 512), creating a program using a development platform (step 514), and invoking APIs of the plurality of APIs using connectors of the plurality of connectors (step 516). Method 500 is performable by user-accessible device 100 of network system environment 10 and, more particularly, can be performed using the programs of network scanning module 170, connector generation module 180, and development platform 200. Method 500 is described herein generally with reference to components of network system environment 10, but it is understood that method 500 can be performed by any suitable system for creating software connectors and using those software connectors with a software development platform.

In step 502, a plurality of network addresses is resolved. The plurality of network addresses are network addresses that belong a plurality of systems. More specifically, the plurality of network addresses are network addresses for systems 120A-N. The plurality of network addresses can be resolved by first listening on network interface 108 to receive a plurality of network communications from network 130. In particular, network interface 108 can be configured listen to communications sent on network 130 such that network interface 108 passively receives communications set on network 130. User-accessible device 100 can then resolve network addresses for systems 120A-N based on the received network communications.

In step 504, a plurality of APIs is discovered. User-accessible device 100 can analyze the received network communications (i.e., the plurality of network communications received in step 502) to discover APIs operatively connected to and accessible via the network. The APIs can be, for example, APIs 140A-N. As described previously, APIs 140A-N are exposed such that APIs 140A-N can be accessed by devices connected to network 130. Network traffic on network 130 can be analyzed to determine which of systems 120A-N operate one or more APIs. More specifically, user-accessible device 100 can analyze the content of data and requests sent via network 130 to determine which requests are designated for an API, and then store the network address for the exposed API to memory 104 for further use with method 500. Additionally and/or alternatively, user-accessible device 100 can perform test calls to network addresses resolved in step 502 to determine which of those network addresses are addresses for exposed APIs and store those network addresses to memory 104 for further use with method 500. The test calls can be selected to elicit a response from an API having a particular architecture, protocol, and/or format, such that only APIs having the targeted architecture, protocol, and/or format will perform a particular action in response to the test call. The action can be, for example, retrieving particular information or returning a particular message (e.g., a status update), among other options.

In step 506, the plurality of APIs discovered in step 504 are inspected to determine a plurality of invokable elements. Each API discovered in step 504 includes one or more invokable elements that can be invoked to access the functionality of the system operating the API. Each API of the plurality of APIs (e.g., each of APIs 140A-N) can be inspected by, for example, querying API documentation database 150 with API identity information. As referred to herein, API "identity information" includes the protocol, format, architecture, and/or name information for an API, or any other suitable descriptive information for describing an API. User-accessible device 100 can determine identity information for each API based on, for example, the network data received in step 502 and/or responses to test calls made during step 504. For example, in embodiments where one or more of the discovered APIs are RESTful APIs, they can be identified as using the REST architecture based on the format and/or contents of requests for the API, and can similarly be identified based on the format and/or content of a test call to the API. Further, if the test call is designed such that only APIs having a particular architecture, protocol, or format will return a particular response, the receipt of the correct response can demonstrate API protocol, architecture, and/or format information. Additionally and/or alternatively, user-accessible device 100 can determine specific identity information for each API, such as one or more names or other identifiers that can be used to distinguish each API from other APIs using similar or substantially the same protocols, architectures, formats, etc. For example, one or more calls can be sent to an API to determine name information for the API.

After determining API identity information, user-accessible device 100 can query API documentation database 150 with the API identity information to obtain API documentation. As described previously, the API documentation stored in API documentation database 150 describes, for each API described in API documentation database 150, one or more functions performed by the API as well as the commands to invoke those functions. The API documentation obtained in step 506 can be used to create connectors in subsequent step 508.

Additionally and/or alternatively, user-accessible device 100 can be configured to perform one or more test calls to an API discovered in step 504 to learn the invokable elements of the API. More specifically, user-accessible device 100 can store (i.e., to memory 104) a plurality of test commands for invoking APIs. The plurality of test commands can be selected based on, for example, common commands for invoking invokable elements, such that invokable elements of the API can be mapped according to the content of the response from the API to each test commands. Additionally and/or alternatively, if possible for a given API (e.g., according to the API architecture), user-accessible device 100 can be configured to request invokable elements information from the API. For example, user-accessible device 100 can be configured to request configuration information for the relevant API. As a specific example, if the API is a RESTful API, user-accessible device 100 can be configured to discover a list of objects and/or methods of the API by accessing, for example, administrator configuration information for the API. In some examples, user-accessible device 100 can be configured to access graphical interface tools for the API to obtain a list of invokable elements for the API.

In step 508, user-accessible device 100 creates a plurality of connectors. The plurality of connectors can be, for example, connectors 240A-N. The connectors created in step 508 allow programs created by development platform 200 to invoke the invokable elements classified in step 506. The connectors can, for instance, be used by user-accessible device 100 and/or the programs of development platform 200 to determine which calls to issue to a particular API according to commands from a program created and/or executed through development platform 200. In this manner, connectors 240A-N function as software intermediaries between programs created and/or executed in development platform 200 and the exposed APIs 140A-N of systems 120A-N. In some examples, abstraction layer 220 of development platform 200 is configured to interpret commands from programs created and/or executed in development environment 210 of development platform 200 and to issue the appropriate command to the appropriate API.

Each connector created in step 508 can be configured to invoke one or more invokable elements determined in step 506 of an API discovered in step 504. As described previously, in the example depicted in FIG. 1, user-accessible device uses individual connectors 240A and 240N to invoke APIs 240A and 240N, respectively, and further uses a single connector 240B to invoke both APIs 240B and 240C. The configuration depicted in FIG. 1 is included for explanatory and illustrative purposes herein and it is understood in other examples that any number of connector modules can be used to allow development platform 200 to access functionality of any number of APIs. For example, two or more connectors can be used to invoke the invokable elements of any of APIs 140A-N. Additionally and/or alternatively, a single connector can be used to invoke the invokable elements of three or more APIs having sufficient similarity (i.e., in architecture, format, etc.).

During step 508, user-accessible device 100 can modify development platform 200 to include the plurality of connectors. More specifically, user-accessible device can modify abstraction layer 220 to include the plurality of connectors. In other examples, the plurality of connectors can be stored and maintained separately from development platform 200 on memory 104, and abstraction layer 220 can be configured to access the plurality of connectors to allow programs executed by development platform 200 to invoke APIs of the plurality of APIs (e.g., APIs of APIs 140A-N).

In step 510, user-accessible device 100 attempts to classify one or more tasks or functions performed by each invokable element for which a connector is created in step 508. Step 510 can be performed substantially simultaneously as step 508, can be performed prior to step 508, and/or can be performed subsequent to step 508. Additionally and/or alternatively, step 510 can be performed during step 506. User-accessible device 100 can determine the task(s) or functions performed by an invokable element by, for example, examining API documentation retrieved from API documentation database 150. As a further example, user-accessible device can determine the task(s) or function(s) performed by an invokable element by inspecting outputs created by the API in response to one or more test calls. Additionally and/or alternatively, user-accessible device can be configured to automatically flag invokable elements for which the programs of user-accessible device are unable to classify for follow-up and subsequent classification by a user. The user can be a user with programming skills and knowledge of APIs, such that the user is able to inspect the invokable element and/or the relevant API to classify the task or function performed by the invokable element.

In step 512, development platform 200 is modified. Development platform 200 is modified to include one or more graphically-represented programming functions that are configured to invoke one or more of the invokable elements for which connecters were created in step 508. The graphically-represented functions include one or more graphics and/or text that are designed to indicate to a user the invokable element(s) that will be invoked by the graphically-represented function when executed. Development platform 200 can be automatically modified by one or more programs of user-accessible device 100 to create the graphically-represented functions. For example, user-accessible device 100 can store (i.e., to memory 104) one or more graphical symbols. User-accessible device 100 can be configured to automatically select one graphical symbol or a combination of graphical symbols to represent the function(s) or task(s) performed by an invokable element, and to modify development platform to include the graphical symbol or combination of graphical symbols as a graphically-represented function to invoke the invokable element. User-accessible device 100 can also be configured to select one or more natural language phrases to describe the task or function performed by an invokable element and to include the natural language phrase(s) as text in place of or in combination with the graphical symbol(s). For example, user-accessible device 100 can create an icon that includes text overlaid onto one or more graphical elements and modify development platform 200 to use the icon as the graphical representation for a graphically-represented function. User-accessible device 100 can include a library of natural language words and/or phrases as well as one or more programs that can be used to select a word, a phrase, or a combination of words and/or phrases to represent the function and/or task performed by an invokable element.

In other examples, a user can manually create an icon to represent the function and/or task performed by an invokable element. A user can also manually modify development platform 200 to include a graphically-represented function using a manually-constructed icon and/or an icon created using programs stored to user-accessible device 100. In yet further examples, development platform 200 can be modified to allow an existing graphically-represented function of development platform 200 to invoke a new connector created in step 508. For example, if the target of the graphically-represented function has been updated or changed such that it requires a new connector to be invoked, abstraction layer 220 can be modified to invoke the correct API element when the graphically-represented function is executed (e.g., when a program including the graphically-represented function is executed).

In step 514, a program is created using development platform 200. The program created in step 514 includes one or more graphically-represented functions that are configured to invoke one or more of the invokable elements determined in step 506 using the connectors created in step 508. The program is created by a user, such as user 300. In at least some examples, the program is created by a power user that is relatively inexperienced in programming with a programming language.

In step 516, the program created in step 514 is executed to invoke an API using one or more connectors created in step 508. As user can execute the program by, for example, interacting with one or more graphical elements of user-accessible device 100 via user interface 106. In some examples, a user can execute the program by interacting with one or more graphical elements of development platform 200 to cause development platform 200 to execute the program. Once executed, the program executed in step 516 invokes one or more invokable elements of APIs 140A-N according to the graphical functions of the program selected in step 514.

Steps 510-512 are optional and can be performed where development platform 200 requires modification for a graphically-represented function to invoke the invokable elements of an API using connectors generated in step 508. In at least some examples, connectors 508 created in step 508 can be configured such that pre-existing functions of development environment 200 are able to access API functionality without requiring modification, reprogramming, or other reconfiguration of the graphical functions of development environment 200. Similarly, steps 514-516 are also optional and can be performed when it is desirable to create a new program that invokes the invokable elements for which connectors were created in step 508. In at least some examples, connectors created in step 508 can be used to allow pre-existing programs created using development platform 200 (i.e., programs created before performance of step 508) to access API functionality.

Method 500 can be performed in multiple iterations at pre-determined intervals to update connectors created using method 500 and, in some examples, to also update the graphically-represented functions of development platform 200 and/or programs created using development platform 200. Some or all of steps 502-512 can also be performed in an automated manner, such that a user is only required to execute one or more pre-configured programs stored to memory 104 to cause user-accessible device 100 to perform steps 502-512. Further, user-accessible device can be configured to automatically perform step(s) of method 500 upon completion of other step(s) of method 500. For example, step 508 (creating the plurality of connectors) can be performed automatically upon the completion of step 506 (inspecting the plurality of APIs to determine a plurality of invokable elements) without additional user input. This example is intended to be non-limiting and in other examples other steps can be performed automatically upon completion of any other step of method 500.

Advantageously, method 500 allows for construction of connectors to enable development platform 200 to invoke APIs 140A-N and, in some examples, allows for the construction of those connectors to be automated. Automating steps of method 500 reduces the overall labor required to perform method 500, thereby reducing costs associated with performing method 500. Further, each step of method 500 can be run in a partially automated and partially manually-performed manner, such that automated programs attempt to perform the steps of method 500 and create prompts or other outputs to indicate to a user that the step should be completed manually for APIs of APIs 140A-N. Method 500 can be used to construct both connectors and graphically-represented functions of development platform 200, allowing method 500 to be performed to confer the advantages of development platform 200 to network environments including systems that operate APIs. Method 500 can be used, for example, to allow for the connectors and graphically-represented functions of development platform 200 to be created for use in an existing enterprise environment, thereby enabling power users of the enterprise environment to take advantage of API functionality to perform certain tasks in less time and with higher efficiency than is often enabled by the graphical tools otherwise available to operate systems of the enterprise environment.

Although method 500 has been generally described herein with respect to network system environment 10, in other examples method 500 can be adapted to create connectors for any suitable system including network-connected systems operating APIs. Similarly, method 500 can also be adapted to modify any suitable development platform to include additional or alter existing graphically-represented functions, and further to create and execute programs using those graphically-represented functions.

Figure 3:
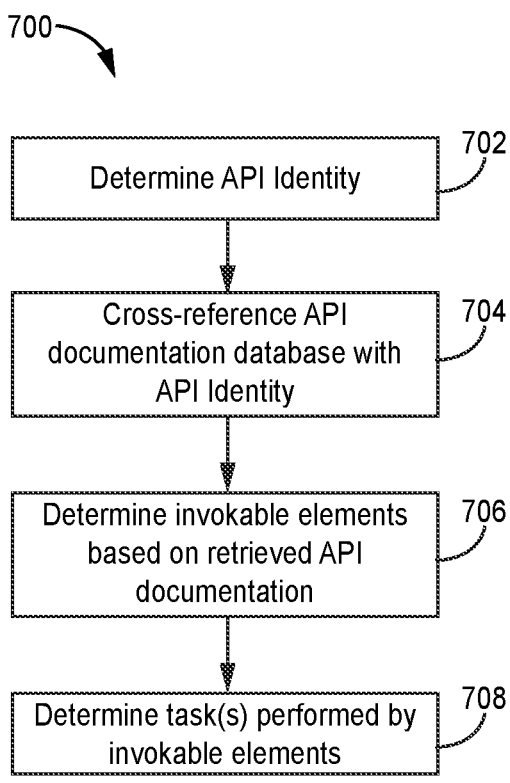
FIG. 3 is a flow diagram of an example of a method of obtaining and using API documentation suitable for use with the method of FIG. 2.

FIG. 3 is a flow diagram of method 700, which is a method of obtaining and using API documentation suitable for use with method 500. Method 700 includes steps of determining an API identity (step 702), querying an API documentation database with the API identity (step 704), determining invokable elements of the API based on the retrieved API documentation (step 706), and determining one or more tasks performed by each invokable element (step 708). Steps 702-706 can be performed during step 506 of method 500 and step 708 can be performed during step 510 of method 500. In examples where step 510 of method 500 is performed during step 506, step 708 can also be performed during step 506.

In step 702, user-accessible device 100 determines an API identity for an API discovered in step 504. Step 702 can be performed according to the methods previously described in the discussion of API identity determination during step 506 of method 500 (FIG. 2). In step 704, user-accessible devices queries API documentation database 150 with the API identity determined in step 702 to retrieve API documentation for the API. In step 706, invokable elements for the API are determined using the API documentation retrieved in step 704. User-accessible device 100 can be configured to automatically scan and interpret retrieved API documentation to discover invokable elements of the API. Additionally and/or alternatively, a user can manually inspect the retrieved API documentation to determine invokable elements for the API. In step 708, the tasks and/or functions performed by each invokable element discovered in step 706 are determined. For each invokable element, user-accessible device 100 can be configured to automatically scan and interpret retrieved API documentation to determine the task(s) and/or function(s) performed by that invokable element. Additionally and/or alternatively, a user can manually inspect the retrieved API documentation to classify the invokable element. Method 700 can be performed for some or all APIs discovered in step 504.

In some examples, the API documentation retrieved in step 704 may not include thorough or adequate description of all invokable elements of the API. In these examples, user-accessible device 100 can be configured to determine the tasks performed by those invokable elements by performing one or more test calls of the API during step 708. User-accessible device 100 can be configured to infer the task(s) or function(s) performed based on the response returned after one or more test calls of the invokable element. Additionally and/or alternatively, user-accessible device can be configured to output a message to the user indicating that the invokable element cannot be classified.

In some examples, user-accessible device 100 is configured to first attempt to classify an invokable element (i.e., to determine the task(s) and/or function(s) performed by the invokable element) using API documentation from API documentation database 150. If user-accessible device 100 is unable to classify the invokable element from the API documentation, user-accessible device 100 can attempt to classify the invokable element by performing one or more test calls. If user-accessible device 100 is still unable to classify the invokable element from the responses to the test call(s), user-accessible device 100 can prompt a user to manually classify the invokable element.

Similarly, if user-accessible device 100 is unable to obtain API documentation for an API (e.g., if API documentation database 150 lacks documentation for the API), user-accessible device 100 can attempt to discover invokable elements of the API by performing one or more test calls. If user-accessible device 100 is unable to determine invokable elements for the API by performing test calls, user-accessible device 100 can also be configured to prompt a user to manually inspect the API to discover the invokable elements of the API.

Advantageously, method 700 allows user-accessible device 100 to automatically attempt to generate API identity information, determine invokable elements of an API, and further to classify those invokable elements using API documentation available in an API documentation database, such as API documentation database 150.

The methods and systems described herein advantageously enable power users to take advantage of API functionality to improve user productivity. Through the combination of development environment 210 and abstraction layer 220, development platform 200 allows power users to use graphically-driven tools to create executable programs that invoke system APIs, significantly improving user productivity for tasks that can be simplified or streamlined through the use of API resources. Further, the methods and systems described herein enable the creation of the connectors and graphically-represented functions of development platform 200 for any suitable network environment. In some examples, the methods and systems described herein enable the connectors and graphically-represented functions of development platform 200 to be created in a fully-automated or at least partially-automated manner.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the present disclosure.

The invention claimed is:

1. A method comprising:
resolving a plurality of network addresses for a plurality of systems connected to a network, each network address of the plurality of network addresses corresponding to a system of the plurality of systems;
discovering a plurality of application programming interfaces operated by the plurality of systems;
inspecting the plurality of application programming interfaces to determine a plurality of invokable elements of the plurality of application programming interfaces;
creating a plurality of connectors executable by a development platform to invoke the plurality of invokable elements, wherein:
the development platform includes one or more graphically-represented programming functions;
the plurality of connectors is configured to allow the one or more graphically-represented programming functions of the development platform to invoke one or more of the plurality of invokable elements;
creating, using the development platform, an executable program comprising the one or more graphically-represented programming functions configured to invoke one or more of the plurality of invokable elements using connectors of the plurality of connectors; and
causing the development platform to invoke the one or more of the plurality of invokable elements by executing the executable program.

2. The method of claim 1, wherein creating the plurality of connectors comprises automatically creating the plurality of connectors upon determining the plurality of invokable elements.

3. The method of claim 1, wherein:
the development platform comprises a development environment and an abstraction layer;
the development environment comprises the one or more graphically-represented programming functions;
the abstraction layer is configured to interpret commands from the one or more graphically-represented using the plurality of connectors; and
creating the plurality of connectors comprises modifying the abstraction layer to include the plurality of connectors.

4. The method of claim 3, wherein creating the plurality of connectors comprises modifying the development platform to create the one or more graphically-represented programming functions that, when executed by the development platform, cause the development platform to invoke one or more of the plurality of invokable elements.

5. The method of claim 4, wherein modifying the development platform to create the one or more graphically-represented programming functions comprises modifying the development environment to create the one or more graphically-represented programming functions.

6. The method of claim 1, wherein the development platform comprises at least one of a low-code development environment and a no-code development environment.

7. The method of claim 6, wherein:
the plurality of application programming interfaces comprise a plurality of exposed application programming interfaces exposed by the plurality of systems; and
discovering the plurality of application programming interfaces comprises analyzing the plurality of network communications.

8. The method of claim 1, wherein resolving the plurality of network addresses comprises:
listening on a network interface of a network device connected to a network to receive a plurality of network communications, the plurality of systems connected to the network; and
resolving the plurality of network addresses based on the received plurality of network communications.

9. The method of claim 8, wherein discovering the plurality of application programming interfaces comprises, for each application programming interface:
sending a request to the system of the plurality of systems operating the application programming interface; and
determining that the system operates the application programming interface based on data returned by the system as a result of the request.

10. The method of claim 9, wherein creating the plurality of connectors comprises, for each invokable element:
classifying the task performed by the invokable element; and
modifying the development platform to create a new graphically-represented programming function to invoke the invokable element, wherein one or more graphical elements of the new graphically-represented programming functions are based on the classification of the task performed by the invokable element.

11. The method of claim 9, wherein creating the plurality of connectors comprises, for each invokable element:

classifying the task performed by the invokable element;

selecting an existing graphically-represented function of the development platform based on the classification of the task performed by the invokable element; and modifying the development platform to modify the existing graphically-represented function to invoke the invokable element.

12. The method of claim 11, wherein inspecting the plurality of application programming interfaces to determine a plurality of invokable elements comprises, for each application programming interface:

determining a plurality of objects of the application programming interface; and determining a plurality of methods that operate on the plurality of objects.

13. The method of claim 8, wherein inspecting the plurality of application programming interfaces to determine a plurality of invokable elements comprises, for each application programming interface of the plurality of application programming interfaces:

determining an identity of the application programming interface;

query, using the identity of the application programming interface, an application programming interface documentation database to retrieve application programming documentation for the application programming interface;

determining at least one invokable element based on the retrieved application programming documentation; and for each invokable element, determining a task performed by the invokable element based on the retrieved application programming documentation.

14. The method of claim 8, wherein the plurality of invokable elements comprise at least one of invokable methods, objects, and functions.

15. The method of claim 14, wherein inspecting the plurality of application programming interfaces to determine a plurality of invokable elements comprises, for each application programming interface:

determining an identity of the application programming interface;

cross-referencing the identity of the application programming interface with an application programming interface documentation database to retrieve application programming documentation for the application programming interface;

determining the plurality of objects based on the retrieved application programming documentation; and determining the plurality of methods based on the retrieved application programming documentation.

16. A system comprising:

a plurality of systems connected to a network, the plurality of systems configured to operate a plurality of application programing interfaces; and a user-accessible device connected to the network, the user-accessible device comprising:

a processor;

a user interface;

and a memory including a development platform, the development platform including one or more graphically-represented programming functions that can be graphically displayed using the user interface, the memory comprising instructions that, when executed, cause the processor to:

resolve a plurality of network addresses for the plurality of systems, each network address of the plurality of network addresses corresponding to a system of the plurality of systems;

discover the plurality of application programming interfaces operated by the plurality of systems;

inspect the plurality of application programming interfaces to determine a plurality of invokable elements of the plurality of application programming interfaces;

create a plurality of connectors executable by the development platform to invoke the plurality of invokable elements, wherein the plurality of connectors is configured to allow the one or more graphically-represented programming functions of the development platform to invoke one or more of the plurality of invokable elements;

create, using the development platform, an executable program comprising the one or more graphically-represented programming functions configured to invoke one or more of the plurality of invokable elements using connectors of the plurality of connectors; and cause the development platform to invoke the one or more of the plurality of invokable elements by executing the executable program.

17. The system of claim 16, wherein:

the development platform comprises a development environment and an abstraction layer;

the development environment comprises the one or more graphically-represented programming functions;

the abstraction layer is configured to interpret commands from the one or more graphically-represented using the plurality of connectors; and the instructions, when executed, cause the processor to create the plurality of connectors by modifying the abstraction layer to include the plurality of connectors.

18. The system of claim 17, wherein the instructions, when executed, cause the processor to modify the development environment to create the one or more graphically-represented programming functions.

* * * * *